United States Patent
Mukherjee et al.

(10) Patent No.: US 7,660,774 B2
(45) Date of Patent: Feb. 9, 2010

(54) NONLINEAR NEURAL NETWORK FAULT DETECTION SYSTEM AND METHOD

(75) Inventors: Joydeb Mukherjee, Bangalore (IN); Sunil Menon, Golden Valley, MN (US); Venkataramana B. Kini, Bangalore (IN); Dinkar Mylaraswamy, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 576 days.

(21) Appl. No.: 11/165,985

(22) Filed: Jun. 24, 2005

(65) Prior Publication Data

US 2007/0288409 A1    Dec. 13, 2007

Related U.S. Application Data

(60) Provisional application No. 60/686,369, filed on May 31, 2005.

(51) Int. Cl.
   *G06E 1/00* (2006.01)
(52) U.S. Cl. .......................................... 706/20; 706/27
(58) Field of Classification Search .................. 706/20, 706/25, 27
   See application file for complete search history.

(56) References Cited

OTHER PUBLICATIONS

Mark Kramer ("Nonlinear Principal Component Analysis Using autoassociative Neural Networks" 1991).*
Menon et al ("Startup Fault Detection and Diagnosis in Turbine Engines" IEEE 2003).*
Jonathon Shlens ("A tutorial on Principal Component Analysis" 2005).*
Boaz Lerner et al., "*A Comparative Study of Neural Network Based Feature Extraction Paradigms*," Pattern Recognition Letters, 1999, 7-14, vol. (20) 1. International Association of Pattern Recognition.
Boaz Lerner et al., "*Feature extraction by Neural network Nonlinear Mapping for Pattern Classification.*" The 13th International Conference on Pattern Recognition, 1996, 320-324, vol. 4, Vienna, Austria.
Jianchang Mao & Anil K. Jain, "*Artificial Neural Networks for Feature Extraction and Multivariate Data Projection,*" IEEE Transactions on Neural Network, Mar. 1995, 296-317, vol. 6 No. 2, Nicosia, Cyprus.
Mark A. Kramer, "*Nonlinear Principal Component Analysis Using Autoasssociative Neural Networks,*" AIChE Journal, Feb. 1991, 233-243, vol. 37 No. 2, American Institute of Chemical Engineers, Newark, DE.

* cited by examiner

*Primary Examiner*—David R Vincent
*Assistant Examiner*—Lut Wong
(74) *Attorney, Agent, or Firm*—Ingrassia Fisher & Lorenz, P.C.

(57) ABSTRACT

A system and method for fault detection is provided. The fault detection system provides the ability to detect symptoms of fault in turbine engines and other mechanical systems that have nonlinear relationships. The fault detection system uses a neural network to perform a data representation and feature extraction where the extracted features are analogous to principal components derived in a principal component analysis. This neural network data representation analysis can then be used to determine the likelihood of a fault in the system.

18 Claims, 5 Drawing Sheets

NONLINEAR NEURAL NETWORK FAULT DETECTION SYSTEM AND METHOD

CROSS-REFERENCES TO RELATED APPLICATION

This application claims the benefit of U.S. Provisional Application No. 60/686,369, filed May 31, 2005.

FIELD OF THE INVENTION

This invention generally relates to diagnostic systems, and more specifically relates to fault detection under both transient and steady-state conditions.

BACKGROUND OF THE INVENTION

Modern aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircraft's fault detection system. Some traditional engine fault detection has been limited to methods of fault detection that are based on linear relationships between variables in the system. While these methods have been effective in detecting some faults, they are less effective in detecting faults in systems where there are significant nonlinearities in the system. Many complex systems, such as turbine engines, have substantially nonlinear relationships between variables in the system. In these types of system, the nonlinear relationship between variables reduces the effectiveness of these linear techniques for fault detection.

Thus, what is needed is an improved system and method for fault detection that is able to detect fault in systems with nonlinear relationships among variables or observed measurements.

BRIEF SUMMARY OF THE INVENTION

The present invention provides a fault detection system and method. The fault detection system provides the ability to detect symptoms of fault in turbine engines and other mechanical systems that have nonlinear relationships. The fault detection system uses a neural network to perform a data representation and feature extraction where the extracted features are analogous to principal components derived in a principal component analysis. This neural network data representation analysis can then be used to determine the likelihood of a fault in the system.

Specifically, the neural network is configured into an encoding network and a decoding network. The encoding network receives sensor data and performs a principal component-type analysis to create a reduced feature space data representation of the sensor data. The reduced feature space data representation is in the form a plurality of scores, where the scores are analogous to principal components. The decoding network receives the scores, and outputs a reconstructed estimate of the sensor data. In a properly functioning system, the estimates of the sensor data will closely track the actual sensor data inputs. When a fault occurs in the system it will be manifest as a difference between sensor data and their reconstructed estimates. Thus, by comparing the sensor data to the reconstructed estimate of sensor data, the likelihood of a fault in the system can be determined.

The neural network is trained for fault detection using sets of historical sensor data. When so trained, the neural network is used for fault detection by inputting new sensor data into neural network and comparing new sensor data to the reconstructed estimates. Additionally, the neural network can be used for fault detection by classifying the scores outputted from the encoding network. In this embodiment, the scores are classified by comparing the scores from new sensor data the scores generated from historical sensor data during training.

The present invention provides an improved technique for training the neural network for fault detection. Specifically, the neural network is trained using a technique that separates the training of the encoding network and decoding network.

As one example, the encoding network is trained using an optimization method that uses both variance terms and covariance terms of the scores in an objective function. Specifically, the training method uses historical data and trains the encoding network to minimize the covariance terms and maximize the variance terms of the scores resulting from the neural network mapping. This multi-objective optimization problem is cast into an equivalent single-objective optimization problem. This single objective strikes a balance between the two objectives by suitably transforming one of the objectives and then taking a weighted sum of the two components which achieves minimization of the covariance and maximization of the variance terms The decoding network is trained using a supervised mode of training. In this training method, scores obtained from the encoding network output are used as inputs and the original historical sensor data inputs are used as target values for the decoding network output. As one example, a gradient descent method is used in training the decoding network.

When so trained, the neural network can effectively detect faults in systems with nonlinear relationships between data. Specifically, when so trained with historical data that includes nonlinear relationships, the resulting network will be able to extract features for fault detection capitalizing on the nonlinear relationships among input sensor data.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a fault detection system and method. The fault detection system provides the ability to detect symptoms of fault in turbine engines and other mechanical systems that have nonlinear relationships. The fault detection system uses a neural network to perform a data representation and feature extraction where the extracted features are analogous to principal components derived in a principal component analysis. This neural network data representation analysis can then be used to determine the likelihood of a fault in the system.

Figure 1:
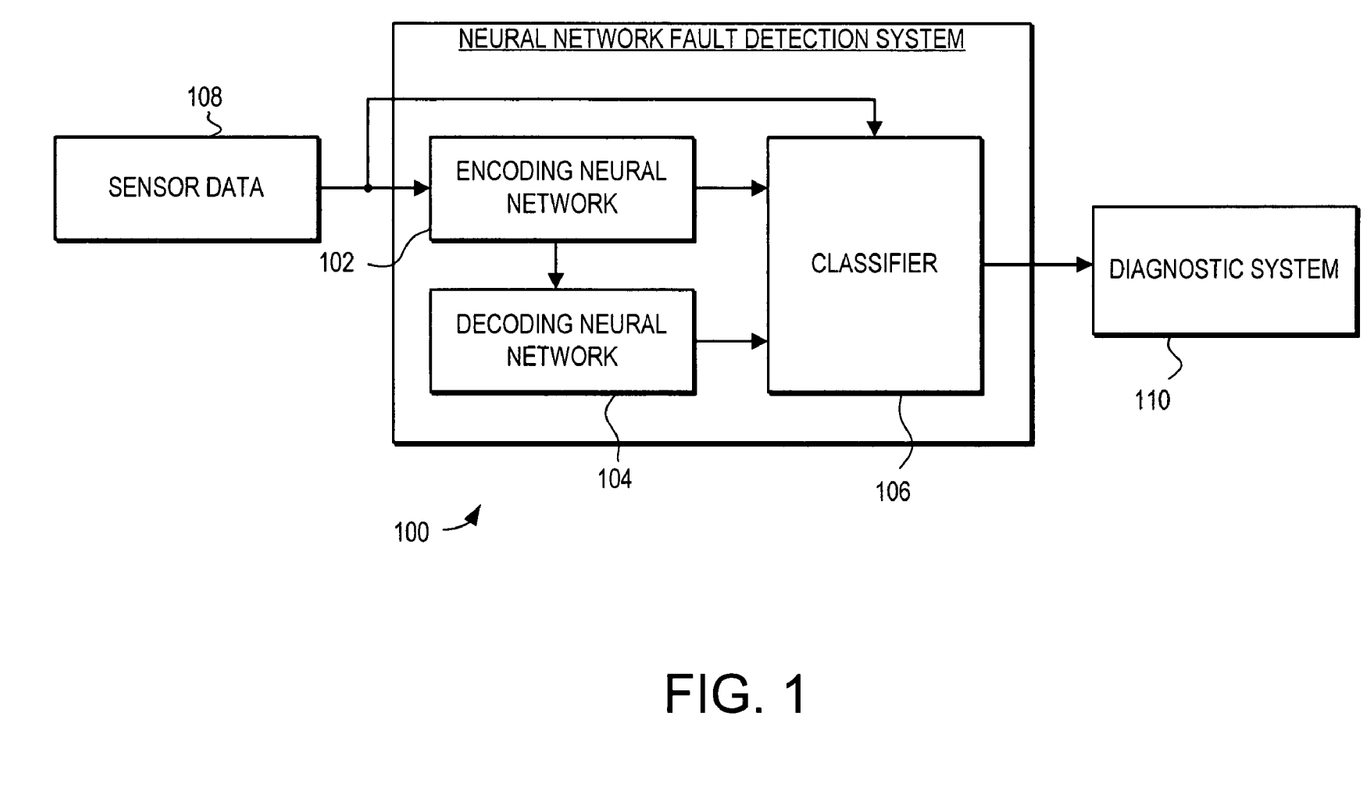
FIG. 1 is a schematic view of a neural network fault detection system.

Turning now to FIG. 1, a neural network fault detection system 100 is illustrated. The neural network fault detection system 100 includes an encoding neural network 102, a decoding neural network 104, and a classifier 106. The neural network fault detection system 100 receives sensor data 108 from the system being monitored, such as from a turbine engine. The sensor data is passed to the encoding neural network 102. The encoding neural network 102 performs a principal component-type analysis to create a reduced feature space data representation of the sensor data 108. The reduced feature space data representation is in the form of a plurality of scores, where the scores are analogous to principal components. The scores are passed to the decoding neural network 104. The decoding neural network 104 receives the scores, and outputs a reconstructed estimate of the sensor data. The reconstructed estimates of sensor data are passed to a classifier 106 that determines if the reconstructed estimate of the sensor data is indicative of fault in the system. As stated above, in a properly functioning system, the estimates of the sensor data will closely track the actual sensor data inputs. When a fault occurs in the system it will be manifest as a difference between sensor data and their reconstructed estimates. Thus, the classifier 106 can determine the likelihood of fault in the system by comparing the sensor data to the reconstructed estimate of sensor data. The likelihood of the fault in the system can then be passed to the diagnostic system 110, which can take any appropriate action.

In a variation on this embodiment, the scores output from the encoding neural network 102 are also used for fault detection. In this embodiment, the scores 102 are passed to the classifier 106, which determines if the scores are indicative of fault in the system. In one embodiment, the classifier 106 classifies the scores by comparing the scores from new sensor data to scores generated from historical sensor data during training, and passes the results to the diagnostic system 110.

The neural network fault detection system 100 is trained for fault detection using sets of historical sensor data. The present invention provides an improved technique for training the neural network for fault detection. Specifically, the neural network is trained using a technique that separates the training of the encoding neural network 102 and decoding neural network 104.

As one example, the encoding neural network 102 is trained using an optimization method that uses both variance terms and covariance terms of the scores in an objective function. Specifically, the training method uses historical data and trains the encoding neural network 102 to minimize the covariance terms and maximize the variance terms of the scores resulting from the neural network mapping. This multi-objective optimization problem is cast into an equivalent single-objective optimization problem. This single objective strikes a balance between the two objectives by suitably transforming one of the objectives and then taking a weighted sum of the two components which achieves minimization of the covariance and maximization of the variance terms The decoding neural network 104 is then trained using a supervised mode of training. In this training method, scores obtained from the encoding network output are used as inputs and the original historical sensor data inputs are used as target values for the decoding network output. As one example, a gradient descent method is used in training the decoding network.

When so trained, the neural network fault detection system 100 can effectively detect faults in systems with nonlinear relationships between data. Specifically, when so trained with historical data that includes nonlinear relationships, the resulting neural networks will be able to extract features for fault detection capitalizing on the nonlinear relationships among input sensor data.

Figure 2:
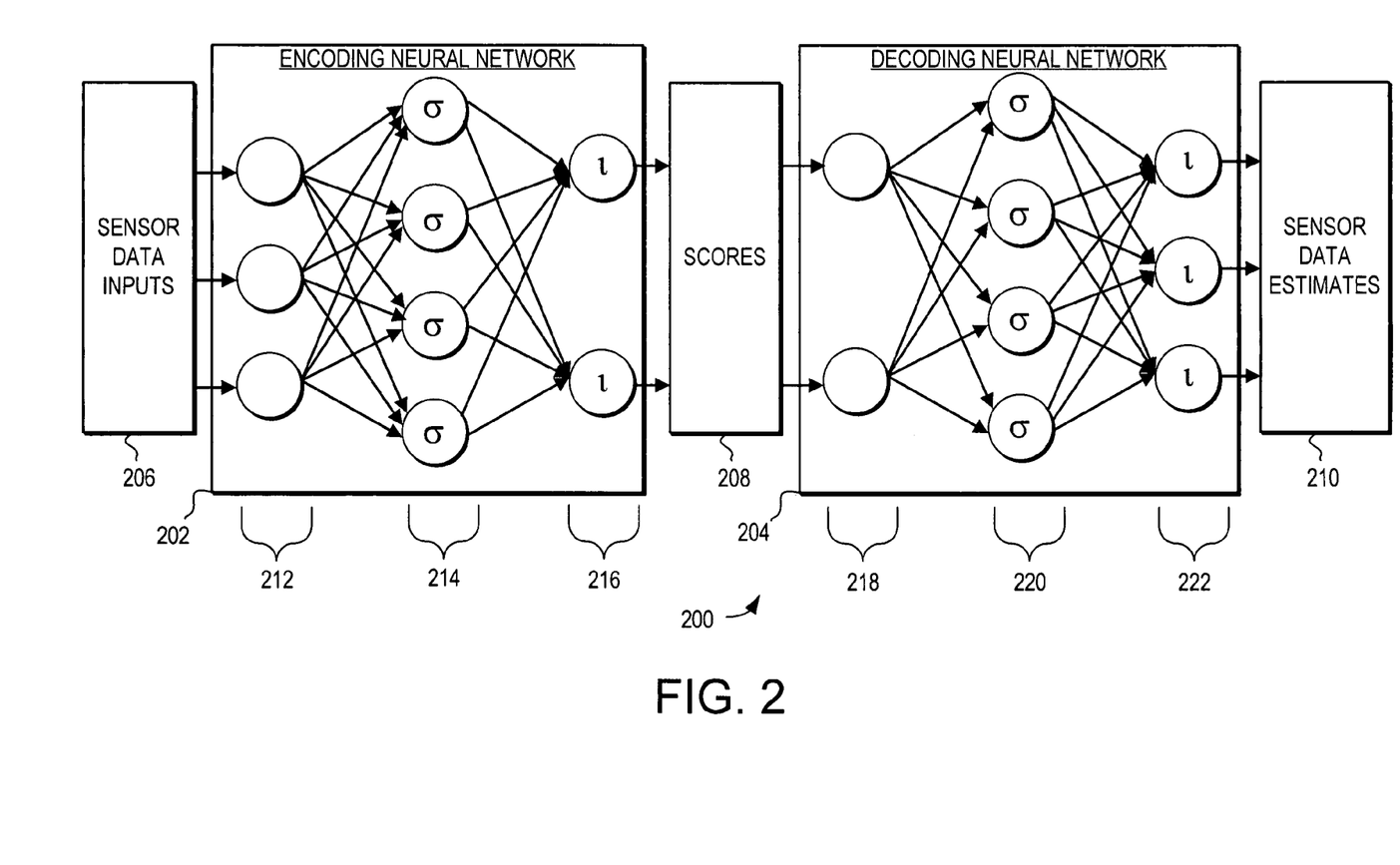
FIG. 2 is a schematic view of a encoding and decoding network in accordance with one exemplary embodiment.

Turning now to FIG. 2, an exemplary embodiment of a neural network fault detector 200 is illustrated schematically. The neural network fault detector 200 includes an encoding neural network 202 and a decoding neural network 204. In general, neural networks are data processing systems that are not explicitly programmed. Instead, neural networks are trained through exposure to real-time or historical data. Neural networks are characterized by powerful pattern matching and predictive capabilities in which input variables interact heavily. Through training, neural networks learn the underlying relationships among the input and output variables, and form generalizations that are capable of representing any nonlinear function. As such, neural networks are a powerful technology for nonlinear, complex classification problems.

The encoding neural network 202 receives sensor data inputs 206 from the system being monitored, such as from a turbine engine. In some embodiments the sensor data comprises raw sensor data. In other embodiments, the sensor data is preprocessed using a suitable technique. For example, the sensor data can be preprocessed by passing through a semi-empirical polynomial model of the system to correct and normalize them for varying operating conditions and to account for system specific idiosyncrasies.

The encoding neural network 202 performs a principal component-type analysis to create a reduced feature space data representation of the sensor data 206. The reduced feature space data representation is in the form of a plurality of scores 208, where the scores 208 are analogous to principal components. The neural network is trained in such a way that the generated scores have a high variance and a minimized covariance.

The scores 208 are passed to the decoding neural network 204. The decoding neural network 204 receives the scores, and outputs reconstructed sensor data estimates 210. In a properly functioning system, the sensor data estimates 210 will closely track the actual sensor data inputs 206 within a specified level of noise. When a fault occurs in the system it will be manifest as a difference between sensor data 206 and the reconstructed sensor data estimates 210 beyond the level of noise.

In the illustrated embodiment, both the encoding neural network 202 and the decoding neural network 204 comprise multi-layered feed-forward neural networks. Specifically, the encoding neural network 202 comprises an input layer 212, a mapping layer 214 and an output layer 216. The decoding neural network 204 likewise comprises an input layer 218, a demapping layer 220 and an output layer 222. Each of these layers includes a plurality of nodes, with each node having a corresponding activation function. Typically, the number of nodes in each layer would depend upon a variety of factors.

For example, the number of nodes in the input layer 212 of the encoding neural network 202 would typically be equal to the number of sensors providing data. For example, in a turbine engine system that provides ten different sensor data measurements during each event, the input layer of the encoding neural network 202 would include ten nodes.

The number of nodes in the output layer 216 of the encoding neural network 202 corresponds to the number of "scores" generated by the neural network. As described above, the scores are a reduced feature space data representation of the sensor data, and are analogous to principal components. To provide a reduced feature space representation, the number of nodes in this output layer 216, and thus the number of scores, will be less than the number of input nodes to the system. The exact number of nodes in this layer would depend on variety of factors.

Both the mapping layer 214 and demapping layer 220 would typically have a larger number of nodes than the input and output layers. This is to ensure good generalization and prevents the network from forming a look-up table. The output layer 222 of the decoding network 204 would have the same number of nodes as the input layer 212 of the encoding network 202 since the outputs are reconstructed estimates of the input values.

Each node in the encoding and decoding neural network includes an activation function. Specifically, each node takes weighted combinations of the node inputs and applies it to an activation function to produce some output, which is then passed to other nodes in the network. To facilitate data representation of nonlinear relationships in the sensor data, the nodes of the mapping layer 214 and demapping layer 220 would typically have nonlinear activation functions. Nonlinear activation functions produce a nonlinear output. The use of nonlinear activation functions facilitates the modeling of nonlinear data distributions. As one example, the nonlinear activation function can comprise a sigmoidal activation function. Specifically, the nonlinear activation function σ(y) can be defined as:

$$\sigma(y) = \frac{1}{1 + \exp(-y + \theta)} \quad \text{Equation 1.}$$

$$\text{where, } y = \sum_{i=1}^{n} x_i w_i$$

and θ is a bias

In most embodiments, the output layer 216 and output layer 222 do not require nonlinear activation functions. In these layers, a more typical linear activation function can be used. For example, a linear activation function σ(y) can be defined as:

$$\sigma(y) = y \quad \text{Equation 2.}$$

$$\text{where, } y = \sum_{i=1}^{n} x_i w_i$$

and, θ is a bias

Again, it should be noted that the number of layers, and the number of nodes in each layer illustrated in the neural network fault detector 200 is merely exemplary, and that in other embodiments the number of nodes and number of layers could differ significantly from the illustrated example.

Each node in the neural network has an associated weight or weight vector. Training the neural network determines the weights associated with each node in the network. The neural network is trained for fault detection using sets of historical sensor data. When so trained, the neural network is used for fault detection by inputting new sensor data into neural network and comparing new sensor data to the reconstructed estimates. Additionally, the neural network can be used for fault detection by classifying the scores output from the encoding network. In this embodiment, the scores are classified by comparing the scores from new sensor data with scores generated from historical sensor data during training.

In one embodiment, the encoding neural network is trained using a technique that separates the training of the encoding network and decoding network. To train the encoding network, an optimization method that uses an objective function is performed. Specifically, the weights of the nodes in the neural network are adjusted until the requirements of objective function are met.

As one specific embodiment, the objective function includes both variance terms and covariance terms. Specifically, the objective function is selected to minimize the covariance terms and maximize the variance terms. This results in scores that are decorrelated. Decorrelated scores can represent the sensor data in a reduced feature space while minimizing the amount of redundant information in the scores. While this is a multi-objective optimization problem, it can be cast into an equivalent single-objective optimization problem through the use of suitable objective function. As one example, an objective function $E_{SANLPCA}$ can be defined as:

$$E_{SANLPCA} = \max \sum_{i=1}^{p} t_i^T t_i + \min \sum_{1 \neq j}^{p} |t_i^T t_j| \quad \text{Equation 3.}$$

where $t_i$ is a vector of the $i^{th}$ score. The first component in this objective function will serve to increase the variance of individual scores. The second component of the objective function will decrease the covariance or cross-correlation terms. Increasing variance and decreasing covariance amount to de-correlating the components. In other words there will be least redundancy present between any two components. This in turn leads to lesser variation in prediction of class label. Also, this can reduce the amount of data required to be passed to the subsequent stage. Third, in the reduced feature space (i.e. in the space of scores) the cluster corresponding to any class, such as nominal or faulty will be well separated (i.e., less non-overlapping). So defined, the objective function strikes a balance between two objectives by suitably transforming one of the objectives and then taking a weighted sum of the two components which achieves minimization of the covariance and maximization of the variance terms.

A detailed example of how equation 3 can be used to train the neural network fault detector will now be discussed. Typically, the first step in training the neural network would be to select an appropriate set of historical sensor data that can be used for training. Typically, the larger number of samples used the better the ultimate accuracy of the training. It is also typically desirable to reserve some number of historical sensor data for testing of the trained neural network. In one embodiment, the historical sensor data used for training is all taken from systems that are known to be properly performing. In this technique, the trained neural network will track a properly functioning system. In alternative methods, the neural network can be trained with data from systems that are known to be experiencing fault.

With the historical sensor data selected for training, the next step would typically be to normalize and format the sensor data. Normalizing the sensor data can involve both centering the historical sensor data on the mean and dividing by a standard deviation. This produces sensor data with zero mean and unit variance, generally referred to as normalized sensor data. Performing data normalization on the sensor data puts the data into a range that can be better used for training the neural network. With the data normalized, it can be formatted into a format that can be used by the training system. For example, some training programs use large matrices for inputting the historical sensor data into the system.

With the training data selected and normalized, the objective function and the historical sensor data can be used to train the encoding neural network. This is an optimization process that typically starts with randomized weight assignments to the weight vectors in all the nodes of the encoding neural network. The assigned weights are then optimized to produce an optimal balance between the two components of the objective function. This optimization involves searching for directions and marching along them until the balance between the components of the objective function is achieved. Again, as the objective function is a multi-objective optimization problem, the goal is to maximize one component (the variance) and minimize the other component (the covariance) of the objective function.

A variety of different mathematical techniques can be used to optimize the weights of the encoding neural network to meet the requirements of objective function. As one example, the optimization can use batch processing. In batch processing, the derivative of the objective function is computed with respect to each of the weights in the network. Each data point is fed into the derivative of the objective function, and a net change in the weights that result from each data point is calculated. The net change in weights is calculated for all the data in the historical sensor data. The net change of weights is then combined together to determine how the weights should be changed to optimize the objective function. This process can be repeated iteratively until a solution is reached that best meets the requirements of the objective function.

The end result is that the weights of each of the nodes in the neural network are calculated that best meet the requirements of the objective function. When such a neural network is used in fault detection, the encoding neural network will minimize the covariance and maximize the variance in the resulting scores. With the covariance minimized and the variance maximized, the resulting encoding network will be able to extract features for fault detection capitalizing on the nonlinear relationships among input sensor data.

With the encoding network so trained, the decoding network can be trained using a variety of different techniques. As one example, the decoding network is trained using a supervised mode of training. In this training method, scores obtained from the encoding network output are used as inputs and the original historical sensor data inputs are used as target values for the decoding network output. For example, the mean squared error between the actual input sensor data and reconstructed estimates of the sensor data can be minimized to train the decoding network. A variety of different techniques can be used to solve this optimization problem. For example, the problem can be solved by marching in the weight-space according to gradient descent algorithm.

Thus, the encoding part of the neural network is trained using historical sensor data as an input to the encoding network and a training rule which specifies the desired relations among scores. The decoding part of the neural network is trained with the scores obtained from the already trained encoding network as inputs and original data as target outputs. It may be noted that the connection between the encoding and the decoding part of the neural networks is notional (since the decoding network depends for its training on the scores) and there is no requirement of physical connectivity between them.

Furthermore, the splitting of the network into encoding and decoding networks is desirable for several specific reasons. First, it facilitates the use of a lesser number of weights (associated with the linkages) that need to be dealt with simultaneously during training. This results in reduced complexity and speedup during training. Additionally, the scores obtained can be constrained to be decorrelated something which is not typically possible in the more conventional methods. Finally, this method facilitates the optimization of the number of output nodes for the encoding network. Specifically, by running the network training several times with different number of nodes the optimal number of nodes can be determined for each layer. Such an optimization is not as easy in more conventional methods.

When the encoding and decoding networks are so trained the results can be validated by inputting other historical sensor data and comparing the final output with the sensor data inputs. The process of training can be continued until the decoding network outputs within a threshold difference of the original sensor data.

When the encoding and decoding networks are so trained and tested, the neural network can effectively detect faults in systems with nonlinear relationships between data. Specifically, when so trained with historical data that includes nonlinear relationships, the resulting network will be able to extract features for fault detection capitalizing on the nonlinear relationships among input sensor data. These features are extracted in the form of scores, which can then be used to determine if there is a fault in the mechanical system.

As described above, the trained neural network is used for fault detection by inputting new sensor data into neural network and comparing new sensor data to the reconstructed estimates. A variety of sophisticated techniques can be used for classifying the results. For example, the Q statistics can be calculated for the estimated sensor values and compared to a threshold. In one specific embodiment, the reconstructed sensor data is used to detect fault by tracking the reconstruction error (e.g., the sum of squared differences between the sensor data and the estimated data). If the error exceeds some predefined threshold (e.g. three times the standard deviation of the reconstruction error for the normal case computed from the historical data used for training) an alarm is flagged.

Additionally, the neural network can be used for fault detection by classifying the scores generated from the encoding network. In this embodiment, the scores are classified by comparing the scores from new sensor data with scores generated from historical sensor data during training. This typically involves determining whether a new score belongs to a cluster of scores from faulty data or a cluster of scores from nominal data. For example, the distances between a new score and the cluster centroids of nominal data scores and faulty data scores can be calculated. Whichever distance is minimum determines the class of the new score. In one example the distance metric used is Euclidean. However, other types of distance metric can also be used, including those metrics which take in to considerations the spread (i.e. variance) of the clusters. One such distance metric is known as Mahalanobis distance.

One specific application for a neural network fault detector will now be discussed. In this application, the neural network fault detector is implemented to detect faults in a turbine engine system. In a typical engine, the system can be divided into two main components: low pressure and high pressure. The low-pressure section makes use of a gear reduction unit to drive a single-stage fan off the two-stage, low-pressure turbine. The high-pressure system consists of a double compressor and a gearbox, both driven by the high-pressure turbine. A typical turbine engine will provide a variety of measurements. For example, the sensor data measurements can include total air temperature (deg. F., TAT), altitude (feet, Alt), Mach number (no units, Mach), engine oil temperature (deg. F., TOil), and fuel flow (lbs/hr, Wf), low-pressure spool speed (percentage of full speed, N1), high-pressure spool speed (percentage of full speed, N2), and the exhaust gas temperature (deg. C., EGT).

In this specific example, three types of engine sensor data, N2, EGT and Wf will be used to detect faults in a turbine engine. These faults include, but are not limited to, high-pressure power section degradation, combustor liner rupture and, bleed band leakage. In this example, the sensor data is preprocessed and inputted into a neural network fault detection system. The neural network fault detection system has a 3-5-2 and 2-5-3 split architecture: the input layer has three input nodes using linear activation function; the hidden layer has five nodes using sigmoidal activation function; the output layer of the encoding neural network has 2 nodes; de-mapping network has symmetric structure.

In this example, the outputs out of the output layer of the encoding network are used as scores for classifying different nominal and faulty data. Specifically, the new data points (e.g., new data from an engine under test) are projected onto the score space created during training to obtain their new coordinates with respect to this space. Using Mahalanobis distance, the new scores can be clustered with the closest class.

It should be noted that the fault detection system has been described as merely detecting faults, it can also be generalized for fault identification as well. Specifically, by characterizing different faulty classes with features extracted from data representative of those classes the system can distinguish among the fault classes. In other words, fault identification can be achieved as well assuming that there are enough data provided for extraction of characteristic features.

Figure 3:
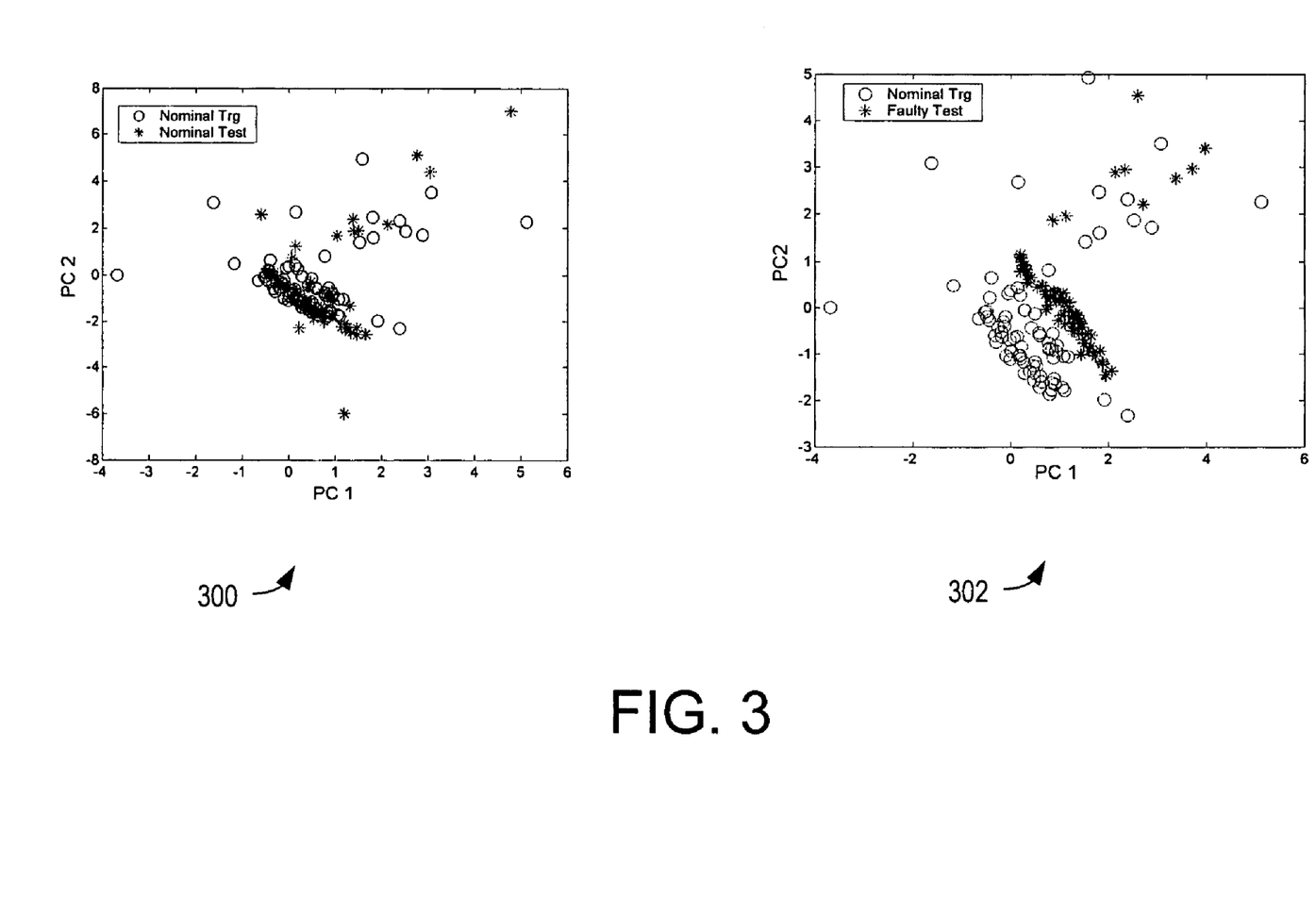
FIG. 3 are graphical views of exemplary cluster distributions for a high-pressure power section in a turbine engine.

Turning now to FIG. 3, exemplary cluster distributions for a high-pressure power section are illustrated in graphs 300 and 302. Specifically, graph 300 shows how the extracted scores are clustered for a good turbine engine, and graph 302 shows how the scores are clustered in a turbine engine that has a high-pressure power section degradation fault against nominal data. These graphs show examples of the cluster distributions for nominal and faulty models. Each graph shows the data for two scores, a first score PC1 and a second score PC2. Along the direction of the first score PC1 the variation in the score is maximum, and along the direction of the second score PC2, the variation in the score ranks next.

Specifically, graph 300 shows the variance of a first score (PC1) and a second score (PC2) for scores generated from good engine data (nominal test) overlaid with scores generated from good engines during training (nominal trg). Likewise, graph 302 shows the variance of the first score (PC1) and the second score (PC2) for scores generated from bad engine data (faulty test) overlaid with scores generated from good engines during training (nominal trg).

It should be noted that both the neural networks can be trained with data from either a good (nominal) engine or a faulty engine. Likewise, during use the sensor data will come from either a good engine or a faulty engine. In these cases, the cluster distributions of nominal and faulty classes yield four possible combinations. In a system based on nominal training and nominal testing data system, the points are projected onto the same space and will either overlap or be very close to each other. In contrast, when faulty test data is projected onto the nominal model space the points will have minimum overlap. Likewise, when system is trained with faulty data, and the input is normal, the points will have minimum overlap. Finally, when the system is trained with faulty data and tested with faulty data, both of them come from the same space and there will be maximum overlap in the scores obtained from them.

Figure 4:
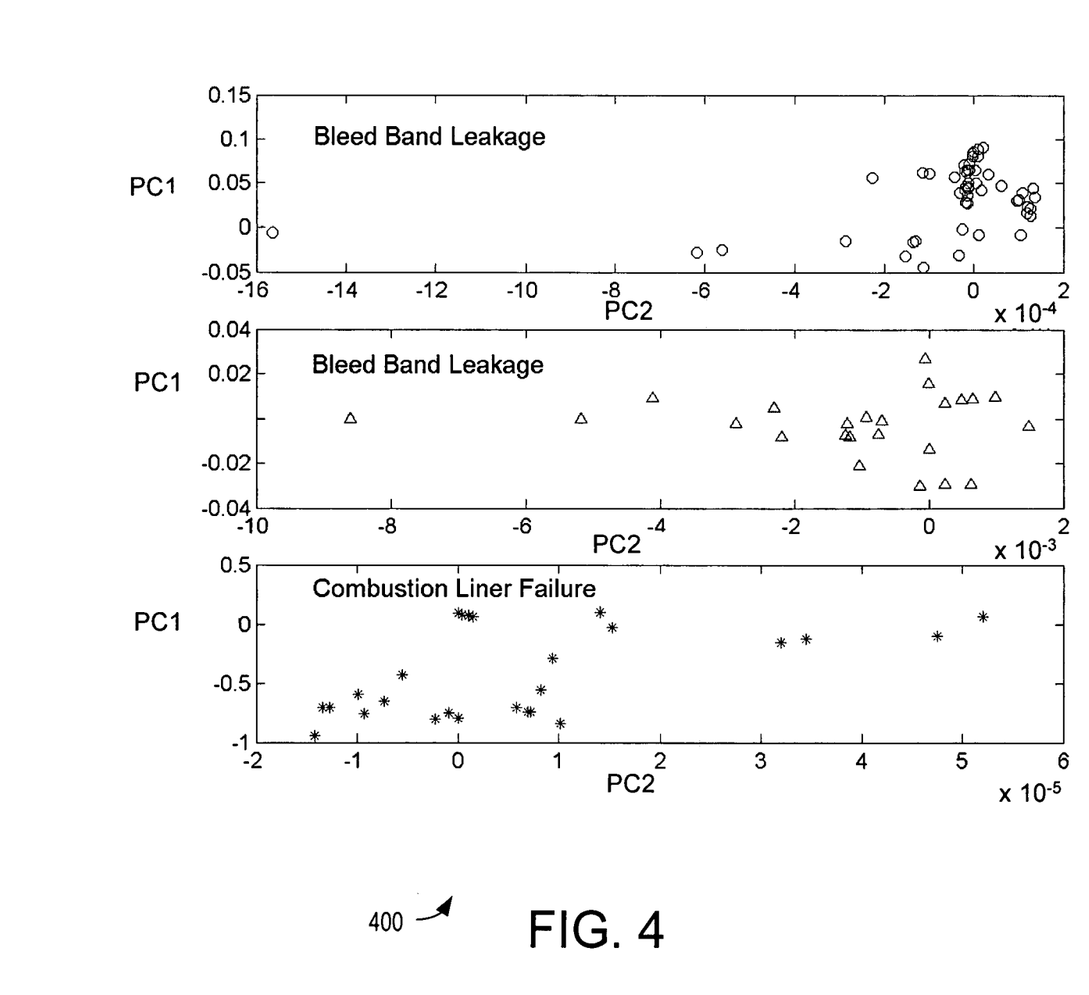
FIG. 4 are graphical views of exemplary feature space representations for different types of faults in a turbine engine.
Figure 5:
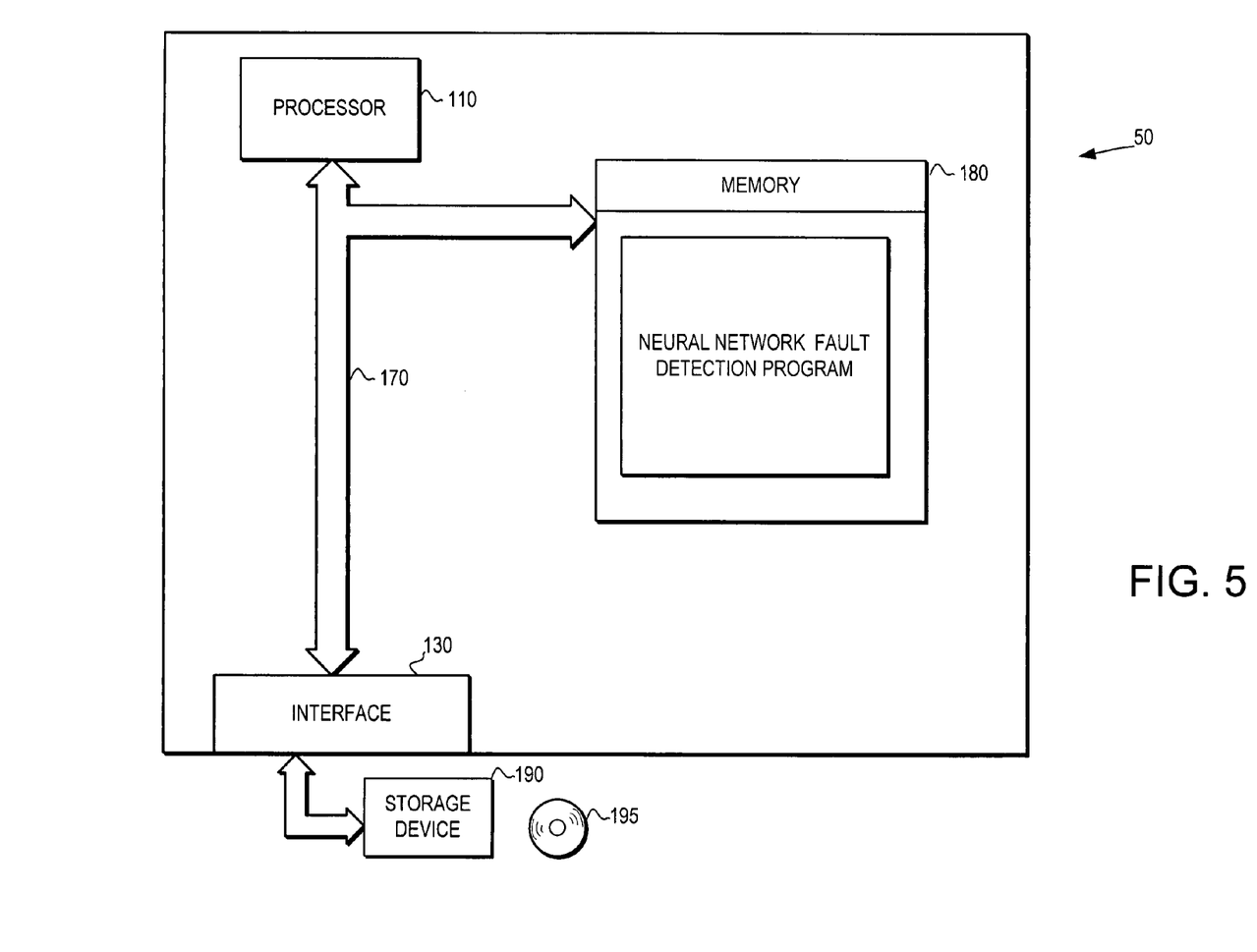
FIG. 5 is a schematic view of a computer system that includes a neural network fault detection program.

Turning now to FIG. 4, a graph 400 illustrates how the neural network fault detection system can be used to classify between two types of faults. Each graph shows clusters of first scores PC1 and second scores PC2 generated from engines with different types of faults. Specifically, between Bleed Band Leakage and Combustor Liner Rupture. First two subplots are score space representations for bleed band leakage type of fault for two different propulsion engines. The third plot is feature space representation for combustor liner rupture type of fault for a third propulsion engine. On first sight features for both types of faults seem to be scattered. However, closer examination reveals that scores for combustor liner failure lie in the range [−1.0 0.4] and [−1.5 5.5]*$10^{-5}$ whereas the scores for bleed band leakage (for two different engines) lie in the range [−0.04 0.04] and [−9.0 2.0]*$10^{-3}$; [−0.05 0.1] and [−16.0 2.0]*$10^{-4}$ respectively. Thus, the combustor liner failure occupies a very narrow band on the second score axis. Any new point having second score value less than −1.5*$10^{-5}$ or more than +5.5*$10^{-5}$ will more likely belong to bleed band leakage class. On the other hand, any new point having first score value less than −0.05 or more than +0.1 will more likely belong to combustor liner failure because along the first score axis bleed band leakage occupies a range [−0.05 0.1]. Using these thresholds one can arrive at the correct class of any new data point. Additionally, better classification results can be obtained by considering both the scores simultaneously. For example, any new point having first score outside the range [−0.05 0.1] and second score inside the range [−1.5 5.5]*$10^{-5}$ will definitely belong to the class combustor liner failure. On the other hand, any point having first score inside the range [−0.04 0.04] and the second score outside the range [−1.5 5.5]*$10^{-5}$ will definitely belong to the class bleed band leakage The neural network fault detection system and method can be implemented in wide variety of platforms. Turning now to FIG. 5, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a neural network fault detection program.

The processor 110 performs the computation and control functions of the system 50. The processor 110 may comprise any type of processor, including single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 5, storage device 190 can comprise a disc drive device that uses discs 195 to store data.

In accordance with the preferred embodiments of the invention, the computer system 50 includes the neural network fault detection program. Specifically during operation, the neural network fault detection program is stored in memory 180 and executed by processor 110. When being executed by the processor 110, the neural network fault detection system monitors operation parameters to identify potential faults.

As one example implementation, the neural network fault detection system can operate on data that is acquired from the system (e.g., turbine engine) and periodically uploaded to an internet website. The neural network analysis is performed by the web site and the results are returned back to the technician or other user. Thus, the system can be implemented as part of a web-based diagnostic and prognostic system.

It should also be understood that while the present invention has been described as particularly applicable to fault detection in a turbine engine, the present invention can also be applied to other mechanical systems in general and other aircraft systems in particular. Examples of the types of aircraft systems that the present invention can be applied to include environmental control systems, aircraft hydraulic systems, aircraft fuel delivery systems, lubrication systems, engine starter systems, aircraft landing systems, flight control systems and nuclear, biological, chemical (NBC) detection systems.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of computer-readable signal bearing media include: recordable media such as floppy disks, hard drives, memory cards and optical disks (e.g., disk 195).

The present invention thus provides a fault detection system and method. The fault detection system provides the ability to detect symptoms of fault in turbine engines and other mechanical systems that have nonlinear relationships. The fault detection system uses a neural network to perform a data representation and feature extraction where the extracted features are analogous to principal components derived in a principal component analysis. This neural network data representation analysis can then be used to determine the likelihood of a fault in the system.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine, the fault detection system comprising:
    an encoding neural network, the encoding neural network receiving sensor data from the turbine engine, the encoding neural network creating plurality of scores from the sensor data, the plurality of scores comprising a reduced feature space representation of the sensor data; wherein the encoding network is trained with an objective function using historical sensor data, where the objective function includes a sum of variance components and a sum of covariance components, and wherein the encoding neural network is trained with the objective function by maximizing the sum of variance components and minimizing the sum of covariance components; and
    a decoding neural network, the decoding neural network receiving the plurality of scores and creating a reconstructed estimate of the sensor data.

2. The system of claim 1 further comprising a classifier, the classifier comparing the sensor data to the reconstructed estimate of the sensor data to determine a likelihood of a fault in the turbine engine.

3. The system of claim 1 further comprising a classifier, the classifier comparing the plurality of scores to a set of scores generated from historical sensor data.

4. The system of claim 1 wherein the encoding neural network comprises a plurality of nodes, and wherein at least one of the plurality of nodes includes a nonlinear activation function for modeling nonlinear relationships.

5. The system of claim 1 wherein the encoding neural network comprises a mapping layer, the mapping layer including a plurality of nodes, and wherein the plurality of nodes in the mapping layer each includes a nonlinear activation function for modeling nonlinear relationships.

6. The system of claim 5 wherein the encoding neural network further comprises an output layer, the output layer including a plurality of nodes, and wherein the plurality of nodes in the output layer each includes a linear activation function.

7. The system of claim 1 wherein the encoding neural network comprises a multilayer neural network trained using a gradient descent method using an objective function.

8. The system of claim 1 wherein the objective function is defined as:

$$E_{SANLPCA} = \max \sum_{i=1}^{p} t_i^T t_i + \min \sum_{i \neq j}^{p} |t_i^T t_j|$$

where $E_{SANLPCA}$ is the objective function, and $t_i$ is a vector of an $i^{th}$ score generated from an output of the encoding neural network using the historical sensor data as an input to the encoding neural network.

9. The system of claim 1 wherein the decoding neural network is trained using a supervised mode of training using historical sensor data, scores obtained from the output of the encoding neural network as inputs to the decoding neural network and the historical sensor data as target output values.

10. A method of training an encoding neural network for fault detection in a system, the method comprising the steps of:
providing an objective function, the objective function including variance components and covariance components of scores;
providing a set of historical sensor data as input to the encoding neural network; and
optimizing weight assignments in the encoding neural network to maximize the variance components and minimize the covariance components of scores obtained using the set of historical sensor data.

11. The method of claim 10 wherein the objective function includes a weighted sum of the variance components and a weighted sum of the covariance components.

12. The method of claim 10 wherein the objective function is defined as:

$$E_{SANLPCA} = \max \sum_{i=1}^{p} t_i^T t_i + \min \sum_{i \neq j}^{p} |t_i^T t_j|$$

where $E_{SANLPCA}$ is the objective function, and $t_i$ is a vector of an $i^{th}$ score generated from an output of the encoding neural network using the historical sensor data as the input to the encoding neural network.

13. The method of claim 10 wherein the encoding neural network comprises a mapping layer, the mapping layer including a plurality of nodes, and wherein the plurality of nodes in the mapping layer each includes a nonlinear activation function for modeling nonlinear relationships.

14. The method of claim 13 wherein the encoding neural network further comprises an output layer, the output layer including a plurality of nodes, and wherein the plurality of nodes in the output layer each include a linear activation function.

15. The method of claim 10 wherein the encoding neural network creates a plurality of scores from sensor data, the plurality of scores comprising a reduced feature space representation of the sensor data.

16. The method of claim 10 further comprising the step of training a decoding neural network to receive a plurality of scores from the encoding neural network output and create a reconstructed estimate of sensor data.

17. The method of claim 16 where the step of training the decoding neural network comprises using a supervised mode of training using historical sensor data, scores obtained from the output of the encoding neural network as inputs to the decoding neural network and the historical sensor data as target output values.

18. A program product comprising:
a) a fault detection program, the fault detection program including:
an encoding neural network, the encoding neural network receiving sensor data from a turbine engine, the encoding neural network creating plurality of scores from the sensor data, the plurality of scores comprising a reduced feature space representation of the sensor data; wherein the encoding network is trained with an objective function using historical sensor data, where the objective function includes a sum of variance components and a sum of covariance components, and wherein the encoding neural network is trained with the objective function by maximizing the sum of variance components and minimizing the sum of covariance components; and
a decoding neural network, the decoding neural network receiving the plurality of scores and creating a reconstructed estimate of the sensor data, wherein the decoding neural network is trained using a supervised mode of training using the historical sensor data, scores obtained from the output of the encoding neural network as inputs to the decoding neural network and the historical sensor data as target output values; and
b) computer-readable signal bearing media bearing said program.

* * * * *

UNITED STATES PATENT AND TRADEMARK OFFICE
CERTIFICATE OF CORRECTION

PATENT NO. : 7,660,774 B2 Page 1 of 1
APPLICATION NO. : 11/165985
DATED : February 9, 2010
INVENTOR(S) : Joydeb Mukherjee et al.

It is certified that error appears in the above-identified patent and that said Letters Patent is hereby corrected as shown below:

Column 6, line 35, the formula should appear as follows:

$$E_{SANLPCA} = \max \sum_{i=1}^{p} t_i^T t_i + \min \sum_{i \neq j}^{p} |t_i^T t_j| \quad \text{Equation 3.}$$

Column 13, lines 10 and 45, the formulas should appear as follows:

$$E_{SANLPCA} = \max \sum_{i=1}^{p} t_i^T t_i + \min \sum_{i \neq j}^{p} |t_i^T t_j|$$

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,660,774 B2  Page 1 of 1
APPLICATION NO. : 11/165985
DATED : February 9, 2010
INVENTOR(S) : Mukherjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Thirtieth Day of November, 2010

David J. Kappos
*Director of the United States Patent and Trademark Office*